Patented June 12, 1928.

1,673,550

UNITED STATES PATENT OFFICE.

SIDNEY M. CADWELL, OF LEONIA, NEW JERSEY, ASSIGNOR TO THE NAUGATUCK CHEMICAL COMPANY, OF NAUGATUCK, CONNECTICUT, A CORPORATION OF CONNECTICUT.

PROCESS OF TREATING RUBBER AND PRODUCTS OBTAINED THEREBY.

No Drawing.   Application filed March 17, 1927. Serial No. 176,285.

This invention relates to the vulcanization of rubber in the presence of a new class of accelerators and vulcanizing agents and to the products obtained thereby.

The primary object of the invention is to furnish a method for the vulcanization of rubber in the presence of a new class of organic compounds, without the addition of sulphur as such. Another object is to furnish a new type of accelerating agents adapted for use in the vulcanization of rubber containing a vulcanizing agent. A still further object is to provide materials of the type described which shall be comparatively inexpensive and at the same time very powerful. Another object is to provide accelerators and curing agents which are capable of functioning well at temperatures below 286° F., as well as at temperatures above this point.

The invention consists in vulcanizing rubber in the presence of compounds comprising the group

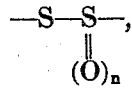

where the compounds may be employed either as vulcanizing agents requiring no additional sulphur or as accelerators in the presence of a vulcanizing agent. The invention also includes the products obtained by vulcanizing rubber in the presence of compounds comprising the group

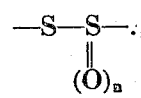

The compounds herein described include derivatives of thiol sulphonic acid, dithiol sulphuric acid, dithiol sulphurous acid, acyl thiol sulphates, thio acyl thiol sulphonates, thiocarbamyl sulphonates, thiol sulphonates, sulphates and sulphites. These compounds all comprise the group

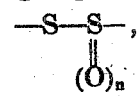

in which $n$ may be one or two. These compounds may be regarded as partially fulfilling the requirements of the general formula

However, it is preferred to describe the compounds as

where R may be acyl, alkyl, aryl, or the group

(in which case R″ may comprise alkyl or aryl and X a bivalent element or group). R′ in the above formula may be acyl, aryl, or alkyl, and may be identical with R.

One example of the invention is as follows:—100 parts of rubber, 10 parts of zinc oxide, and 5 parts of dimethyl thio carbamyl para toluene thiol sulphonate are mixed on a mill in the usual way. This stock when vulcanized in a mold for 1 hr. at 40 lbs. steam pressure is well vulcanized. In this instance the compound functions as a vulcanizing agent, that is, causes vulcanization to take place without requiring the addition of free sulphur or its equivalent. Stocks prepared in this manner are characterized by excellent aging properties, and they do not overvulcanize readily.

As an example in which the thiolsulphonate is used as an accelerator, 100 parts of rubber, 10 parts of zinc oxide, 3 parts of sulphur and 0.15 parts of dimethyl thio carbamyl para toluene thiol sulphonate are mixed on the mills in the usual manner and the resulting batch cured for 15 minutes at 40 lbs. steam pressure. The resulting product is well vulcanized. Equally good results may be obtained by vulcanizing the above stock in a mold for 60 min. at 5 lbs. steam pressure. The thiol sulphonate may be used in various proportions, and if desired may be used in sufficient amounts to function as a vulcanizing agent and as an accelerator in the same compound, in which instance less added sulphur will be required than is the case where the thiol sulphonate is used only as an accelerator.

Instead of the dimethyl compound mentioned in the above examples, 0.2 parts of diethyl thiocarbamyl para toluene thiol sulphonate or 0.15 parts of bis (diethyl thiocarbamyl) dithiol sulphate may be used as accelerators with equally satisfactory results. By increasing the percentage of the thiol sulphonate and omitting the sulphur, these compounds may be employed as vulcanizing agents.

The dimethyl thiocarbamyl para toluene thiol sulphonate may be prepared as follows:—27 parts of dimethyl amine solution containing 33% by weight of dimethyl amine are mixed with 15.2 parts of carbon disulphide, the mixture being cooled externally. Afterwards 8 parts of sodium hydroxide dissolved in about 24 parts of water are added. The reaction mixture contains the sodium salt of dimethyl dithiocarbamic acid. To this are then added in small portions during the course of ½ hr., 38 parts of finely ground para toluene sulphonyl chloride, the mixture being agitated and the temperature being maintained at approximately 25° C. The stirring is continued for about 5 hrs., or until a dried sample of the product shows a melting point of 123° C. The reaction product is then filtered and washed with water until the washings are free from chloride, after which the material is dried. The product may also be prepared by dissolving the para toluene sulphonyl chloride in a water immiscible solvent such as benzol, toluol or solvent naphtha. This solution is stirred with an aqueous solution of any water soluble salt of the dithiocarbamate. Or the para toluene sulphonyl chloride and any convenient dithiocarbamate may be dissolved in a common solvent and allowed to react.

The diethyl compound may be prepared in the same general manner in which the dimethyl thiocarbamyl compound is made.

Bis—(diethyl thiocarbamyl)—dithiol sulphate may be prepared by allowing appropriate amounts of sulphuryl chloride and diethyldithiocarbamate to react in a non-aqueous medium. The invention, however, is not limited to any specific method of preparation for the compounds herein described.

Derivatives of thiol sulphonic acid, dithiosulphuric acid or in general compounds of the formula

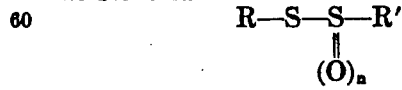

may comprise various substitutions for R and R'. Among such compounds are the following:

Penta methylene thiocarbamyl para toluene thiol sulphonate, dimethyl thiocarbamyl naphthalene thiol sulphonate, dimethyl thiocarbamyl benzol thiol sulphonate, benzothiazyl para toluene thiol sulphonate, bis (diethyl thiocarbamyl) dithiol sulphite, dimethyl thiocarbamyl meta-nitrobenzol thiol sulphonate, n-Butyl butyl thiol sulphonate, dimethyl thiocarbamyl 1-3 dimethyl benzol 4 thiol sulphonate, dimethyl thiocarbamyl 2 nitrotoluene 4 thiol sulphonate, benzyl benzyl thiol sulphonate.

In the case of the dialkyl thiocarbamyl compounds, some of the acceleration is undoubtedly due to the portion of the compound which corresponds to the general formula

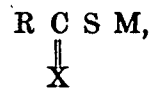

but the strength of the accelerator (or of the curing agent, if it be used as such), is 30% to 40% greater than can be accounted for on the basis of the

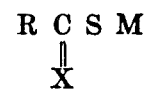

content. This excess in accelerating or vulcanizing strength is due to the

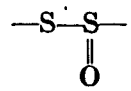

or

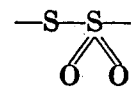

configuration. Where the compounds

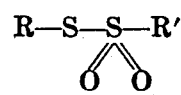

do not contain the group

it will be observed that such compounds are not as strong in their accelerating power. It has also been observed that the heavier the alkyl group in the dialkyl thiocarbamyl thiol sulphonates the better do the accelerators and vulcanizing agents resist burning on the mixing mill. It is also to be observed that dimethyl thiocarbamyl derivatives are not as efficacious as the diethyl and higher dialkyl derivatives in the presence of litharge and the absence of zinc oxide. The higher dialkyl derivatives are particularly valuable for use in rubber stocks containing litharge. Accelerators and vulcanizing agents of the type

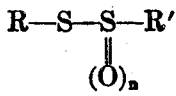

are particularly well suited for use in the presence of reclaimed rubbers, off-grade rubbers and in highly compounded stocks. Many accelerators of this class function very well at steam pressures of 5, 10 and 20 lbs. The dialkyl thiocarbamyl derivatives are excellent accelerators for use in the production of non-blooming air-cured stocks.

Many of the compounds, and particularly dialkyl thiocarbamyl derivatives of aryl thiol sulphonates have not previously been described in the chemical literature. The claims comprehend the use of these compounds as accelerators or as vulcanizing agents, and are intended to include within their scope the use of these compounds to secure the valuable characteristics of strength, elasticity, durability, resistance to deterioration which are sought in rubber products.

Having thus described my invention, what I claim and desire to protect by Letters Patent is:

1. Method of treating rubber which comprises vulcanizing rubber in the presence of an organic compound comprising the group SS in which at least one of the sulphur atoms has at least one atom of oxygen attached thereto.

2. Method of treating rubber which comprises vulcanizing rubber in the presence of an organic compound comprising the group SS in which at least one sulphur atom has at least one atom of oxygen attached thereto by a double bond.

3. Method of treating rubber which comprises vulcanizing rubber in the presence of an organic compound comprising the group SS in which one sulphur atom has at least one atom of oxygen attached thereto by a double bond, and the other sulphur is attached to carbon.

4. Method of treating rubber which comprises vulcanizing rubber in the presence of an organic compound comprising the group SS in which one sulphur atom has at least one atom of oxygen attached thereto by a double bond, and the other sulphur is attached to carbon having a double bond.

5. Method of treating rubber which comprises vulcanizing rubber in the presence of an organic compound of the type

in which both positive and negative sulphur are present.

6. Method of treating rubber which comprises vulcanizing rubber in the presence of an organic compound comprising the group

7. Method of treating rubber which comprises vulcanizing rubber in the presence of organic compounds comprising the group

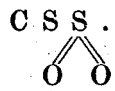

8. Method of treating rubber which comprises vulcanizing rubber in the presence of organic compounds comprising the group

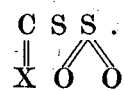

9. Method of treating rubber which comprises vulcanizing rubber in the presence of an organic compound of the type

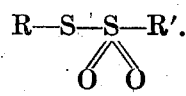

10. Method of treating rubber which comprises vulcanizing rubber in the presence of an organic derivative of thiolacids of the type

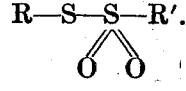

11. Method of treating rubber which comprises vulcanizing rubber in the presence of a thiolsulphonate of the type

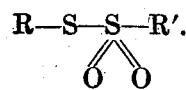

12. Method of treating rubber which comprises vulcanizing rubber in the presence of an organic thiolsulphonate of the type

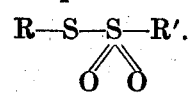

13. Method of treating rubber which comprises vulcanizing rubber in the presence of an acyl thiolacid of the type

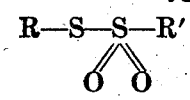

14. Method of treating rubber which comprises vulcanizing rubber in the presence of a derivative of an organic thiol acid containing the grouping

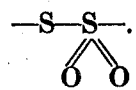

15. Method of treating rubber which comprises vulcanizing rubber in the presence of a derivative of an aryl thiolsulphonate of the type R—S—S—R'. 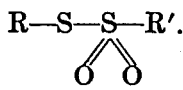

16. Method of treating rubber which comprises vulcanizing rubber in the presence of a toluene thiolsulphonate.

17. Method of treating rubber which comprises vulcanizing rubber in the presence of an acyl derivative of an aryl thiolsulphonate.

18. Method of treating rubber which comprises vulcanizing rubber in the presence of a thioacyl derivative of an aryl thiolsulphonate.

19. Method of treating rubber which comprises vulcanizing rubber in the presence of an acyl toluene thiolsulphonate.

20. Method of treating rubber which comprises vulcanizing rubber in the presence of a thioacyl toluene thiolsulphonate.

21. Method of treating rubber which comprises vulcanizing rubber in the presence of a carbamyl thiolsulphonate of the type R—S—S—R'. 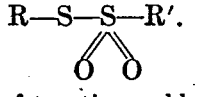

22. Method of treating rubber which comprises vulcanizing rubber in the presence of a carbamyl aryl thiolsulphonate of the type R—S—S—R'. 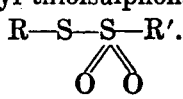

23. Method of treating rubber which comprises vulcanizing rubber in the presence of a carbamyl derivative of a toluene thiolsulphonate.

24. Method of treating rubber which comprises vulcanizing rubber in the presence of an alkyl aryl thiolsulphonate of the type R—S—S—R'. 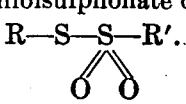

25. Method of treating rubber which comprises vulcanizing rubber in the presence of an alkylaryl thiolsulphonate of the type R—S—S—R'. 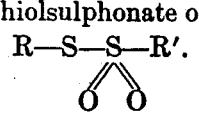

26. Method of treating rubber which comprises vulcanizing rubber in the presence of an alkyl derivative of a toluene thiolsulphonate.

27. Method of treating rubber which comprises vulcanizing rubber in the presence of a thio carbamyl thiolsulphonate of the type R—S—S—R'. 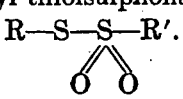

28. Method of treating rubber which comprises vulcanizing rubber in the presence of a thiocarbamyl derivative of a toluene thiolsulphonate.

29. Method of treating rubber which comprises vulcanizing rubber in the presence of an alkyl thiocarbamyl thiol sulphonate of the type R—S—S—R'. 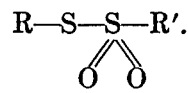

30. Method of treating rubber which comprises vulcanizing rubber in the presence of dimethyl thiocarbamyl para toluene thiolsulphonate.

31. Vulcanized rubber derived from rubber vulcanized in the presence of an organic compound comprising the group SS in which at least one of the sulphur atoms has at least one atom of oxygen attached thereto.

32. Vulcanized rubber derived from rubber vulcanized in the presence of an organic compound comprising the group SS in which at least one sulphur atom has at least one atom of oxygen attached thereto by a double bond.

33. Vulcanized rubber derived from rubber vulcanized in the presence of an organic compound comprising the group SS in which one sulphur atom has at least one atom of oxygen attached thereto by a double bond, and the other sulphur is attached to carbon.

34. Vulcanized rubber derived from rubber vulcanized in the presence of an organic compound comprising the group SS in which one sulphur atom has at least one atom of oxygen attached thereto by a double bond, and the other sulphur is attached to carbon having a double bond.

35. Vulcanized rubber derived from rubber vulcanized in the presence of an organic compound of the type RSSR' 

in which both positive and negative sulphur are present.

36. Vulcanized rubber derived from rubber vulcanized in the presence of an organic compound comprising the group S S . 

37. Vulcanized rubber derived from rubber vulcanized in the presence of organic compounds comprising the group C SS . 

38. Vulcanized rubber derived from rubber vulcanized in the presence of organic compounds comprising the group

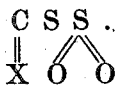

39. Vulcanized rubber derived from rubber vulcanized in the presence of an organic compound of the type R—S—S—R'.
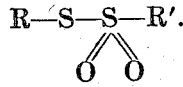

40. Vulcanized rubber derived from rubber vulcanized in the presence of an organic derivative of thiolacids of the type R—S—S—R'.
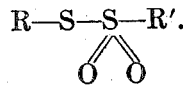

41. Vulcanized rubber derived from rubber vulcanized in the presence of a thiolsulphonate of the type R—S—S—R'.
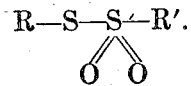

42. Vulcanized rubber derived from rubber vulcanized in the presence of an organic thiolsulphonate of the type R—S—S—R'.
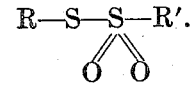

43. Vulcanized rubber derived from rubber vulcanized in the presence of an acyl thiolsulphonate of the type R—S—S—R'.
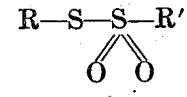

44. Vulcanized rubber derived from rubber vulcanized in the presence of a derivative of an organic thiol acid containing the grouping —S—S—.
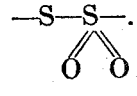

45. Vulcanized rubber derived from rubber vulcanized in the presence of a derivative of an aryl thiolsulphonate of the type R—S—S—R'.
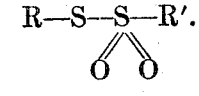

46. Vulcanized rubber derived from rubber vulcanized in the presence of a toluene thiolsulphonate.

47. Vulcanized rubber derived from rubber vulcanized in the presence of an acyl derivative of an aryl thiolsulphonate.

48. Vulcanized rubber derived from rubber vulcanized in the presence of a thioacyl derivative of an aryl thiolsulphonate.

49. Vulcanized rubber derived from rubber vulcanized in the presence of an acyl toluene thiolsulphonate.

50. Vulcanized rubber derived from rubber vulcanized in the presence of a thioacyl toluene thiolsulphonate.

51. Vulcanized rubber derived from rubber vulcanized in the presence of a carbamyl thiolsulphonate of the type R—S—S—R'.
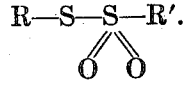

52. Vulcanized rubber derived from rubber vulcanized in the presence of a carbamyl aryl thiolsulphonate of the type R—S—S—R'.
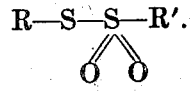

53. Vulcanized rubber derived from rubber vulcanized in the presence of a carbamyl derivative of a toluene thiolsulphonate.

54. Vulcanized rubber derived from rubber vulcanized in the presence of an alkyl thiolsulphonate of the type R—S—S—R'.
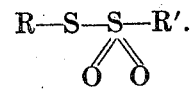

55. Vulcanized rubber derived from rubber vulcanized in the presence of an alkyl aryl thiolsulphonate of the type R—S—S—R'.
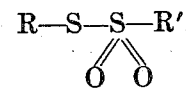

56. Vulcanized rubber derived from rubber vulcanized in the presence of an alkyl derivative of a toluene thiolsulphonate.

57. Vulcanized rubber derived from rubber vulcanized in the presence of a thio carbamyl thiolsulphonte of the type R—S—S—R'.
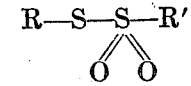

58. Vulcanized rubber derived from rubber vulcanized in the presence of a thiocarbamyl derivative of a toluene thiolsulphonate.

59. Vulcanized rubber derived from rubber vulcanized in the presence of an alkyl thiocarbamyl thiol sulphonate of the type R—S—S—R'.
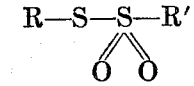

60. Vulcanized rubber derived from rubber vulcanized in the presence of dimethyl thiocarbamyl para toluene thiolsulphonate.

Signed at New York, county and State of New York, this 10th day of March, 1927.

SIDNEY M. CADWELL.

CERTIFICATE OF CORRECTION.

Patent No. 1,673,550.                      Granted June 12, 1928, to

SIDNEY M. CADWELL.

It is hereby certified that error appears in the printed specification of the above numbered patent requiring correction as follows: Page 4, line 43, claim 24, strike out the word "aryl"; page 5, line 108, claim 57, for the misspelled word "thiolsulphonte" read "thiolsulphonate"; and that the said Letters Patent should be read with these corrections therein that the same may conform to the record of the case in the Patent Office.

Signed and sealed this 14th day of August, A. D. 1928.

(Seal)                                                        M. J. Moore,
                                                                Acting Commissioner of Patents.